United States Patent [19]

Schneider et al.

[11] Patent Number: 4,645,451
[45] Date of Patent: Feb. 24, 1987

[54] GAS BURNER FOR EXTERNALLY HEATING GLASS BODIES

[75] Inventors: Hartmut Schneider, Munich; Egon Lebetzki, Berghuelen; Wolfram Vogt, Munich, all of Fed. Rep. of Germany

[73] Assignee: Siemens Aktiengesellschaft, Berlin and Munich, Fed. Rep. of Germany

[21] Appl. No.: 675,999

[22] Filed: Nov. 29, 1984

[30] Foreign Application Priority Data

Jan. 11, 1984 [DE] Fed. Rep. of Germany ....... 3400710

[51] Int. Cl.$^4$ .......................... F23Q 9/00; C03B 27/00; C03B 23/00
[52] U.S. Cl. ..................................... 431/278; 65/120; 65/109; 65/271; 431/283
[58] Field of Search .................... 431/278, 283; 65/12, 65/18.2, 21.3, 25.1, 41, 108, 109, 110, 120, 162, 252, 244, 272, 271, 355; 432/88, 255

[56] References Cited

U.S. PATENT DOCUMENTS

| | | | |
|---|---|---|---|
| 2,595,555 | 5/1952 | Wolf | 65/120 X |
| 2,697,485 | 12/1954 | McNally | 431/283 X |
| 2,781,832 | 2/1957 | O'Connor | 65/271 X |
| 2,917,870 | 12/1959 | Levand | 65/271 |
| 3,113,012 | 12/1963 | Smith | 65/272 X |
| 3,332,764 | 7/1967 | Knox | 65/109 |
| 3,551,128 | 12/1970 | Sawyer | 65/109 |
| 3,741,796 | 6/1973 | Walker | 65/120 X |
| 4,231,777 | 11/1980 | Lynch et al. | 65/120 X |
| 4,464,831 | 8/1984 | Weber et al. | 432/225 X |

OTHER PUBLICATIONS

Sales brochure of Herbert Arnold Co., Weilburg/Lahn, Weilstrasse 21, entitled "Gasbrenner fur Stadtgas-Erdgas-Propangas-Wasserstoffgas", Brennerprospekt 2, p. 22, no date.

H. Schneider et al, "Herstellverfahren und Ausführungsformen von Lichtwellenleitern", *Telcom Report*, 6-1983 Supplement, Nachrichtenübertragung mit Licht, pp. 29–35.

*Primary Examiner*—Larry Jones
*Attorney, Agent, or Firm*—Hill, Van Santen, Steadman & Simpson

[57] ABSTRACT

A gas burner for externally heating a glass tube which is positioned to be rotated on a rotational axis characterized by at least two multi-jet gas port blocks having a block axis with an arrangement of jets therearound being arranged with the block axes being on a radii extending from the rotational axis. Preferably only two port blocks are utilized and they are each separately displaceable relative to one another along the rotational axis and can be simultaneously displaced together along the axis during a heating operation. The arrangement of the plurality of jets on each of the front surfaces of the multi-jet gas port blocks is such that the jets are directed to a focal line which is at a distance beyond the rotational axis and a definite distance in front of the front surface.

17 Claims, 2 Drawing Figures

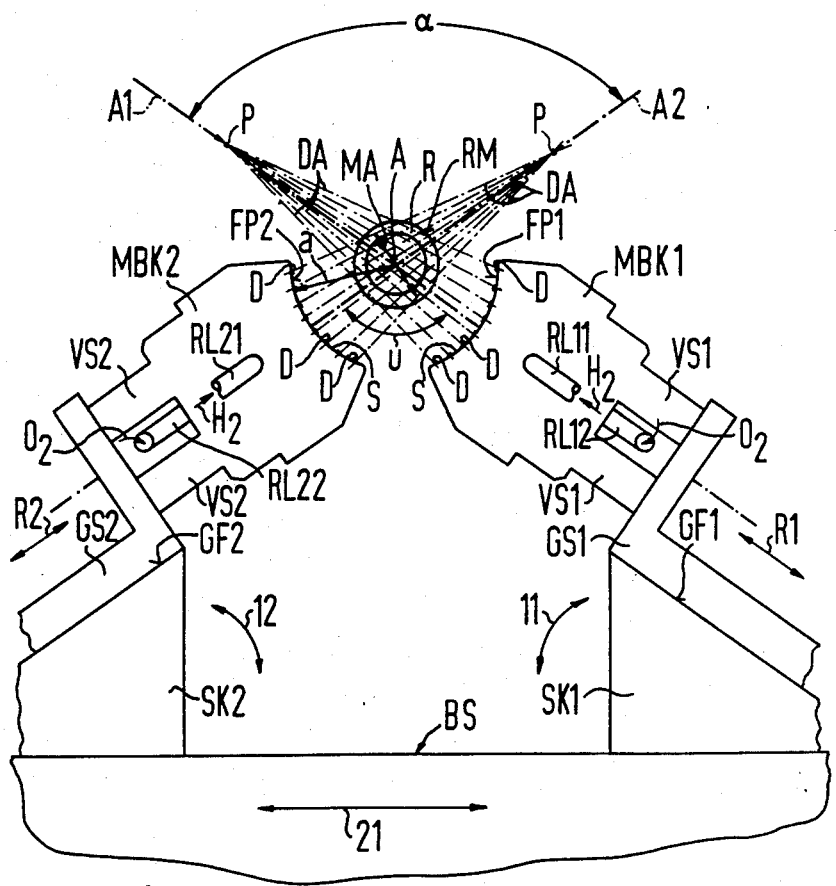

GAS BURNER FOR EXTERNALLY HEATING GLASS BODIES

BACKGROUND OF THE INVENTION

The present invention is directed to a gas burner for externally heating glass bodies, which are rotated relative to the burner on a rotational axis. The burner has a plurality of multi-jet gas port blocks, each of which has a plurality of jets on a front surface arranged around a block axis. The blocks are disposed at a radial distance from said rotational axis and are simultaneously displaceable along the rotational axis. The multi-jet gas blocks are positioned with their block axes extending radially from the rotational axis in different directions with the jets facing the rotational axis. The gas burner is particularly useful for heating glass tubes during the manufacture of preforms for optical glass fibers.

A gas burner, which has a plurality of multi-jet gas port blocks with each block having a plurality of jets on a front surface to surround a block axis with the port blocks being disposed a radial distance from a rotational axis of the workpiece with the block axes extending radially therefrom in different directions and the blocks being simultaneously displaceable along the rotational axis, are known. An example is "gas burner No. 141/16 W-WK-Special" which is disclosed in a sales brochure of Herbert Arnold Co., Weilburg/Lahn, Weilstrasse 21, entitled "Gasbrenner fur Stadtgas - Erdgas - Propangas - Wasserstoffgas", Brennerprospekt 2. This gas burner, in particular, also represents a special development for the light waveguide manufacturing technology.

A standard execution of the gas burner comprises four gas port blocks. A gas burner with which a substrate of workpiece of silica glass can be externally heated to a temperature in the range of 1600° through 2200° C. are required for the manufacture of preforms for light waveguides of glass according to the inside deposition method (see in this regard Telcom Report 6 (1983), Supplement "Nachrichtenubertragung mit Licht", Pages 29–34).

SUMMARY OF THE INVENTION

The present invention is directed to providing an improved gas burner of the above-mentioned type, which burner can produce a hot zone which is favorable for coating of glass bodies particularly the inside coating of a tube as well as a hot zone which is utilized for collapsing the tube. In addition, the burner has an improved heat transfer to the glass body or tube.

To accomplish these goals, the present invention is directed to an improvement in a gas burner for externally heating glass bodies which are to be rotated relative to the burner on a rotational axis particularly for heating glass tubes during manufacture of preforms for optical glass fibers. The burner has a plurality of multi-jet gas port blocks with each block having a plurality of jets on a front surface around a block axis, means for mounting the blocks with the block axes being on separate radii extending from the rotational axis and the jets facing the rotational axis and being at a definite radial distance therefrom and said blocks being simultaneously displaceable along the rotational axis. The improvements comprising the means for mounting enable the the multi-jet gas port blocks to be separately displaceable relative to one another along the rotational axis and to be displaceable relative to the rotational axis along the radial direction and the jets on the front surface of each of the multi-jet blocks are directed to merge on a focal line lying beyond the rotational axis and at a definite distance in front of the front surface.

The inventive gas burner is based upon the following perceptions: a hot zone, which is typically three to six cm long and is conducted along the tube is required for coating a glass body, for example, a tube, which is disposed on a rotational axis between the burner block and is rotated on this rotational axis. A broad hot zone has a beneficial effect for heating and for the conversion of the deposit-forming reaction gases in the tube and thus on the deposit rate. When collapsing the coated tube into a solid rod; however, a narrow hot zone is desirable in order to avoid sagging of the molten, horizontally disposed tube. The hot zone can be selectively lengthened or shortened by means of a relative displacement of the multi-jet gas port blocks along the rotational axis which is one of the improvements of the present invention. Thus, different demands when coating and when collapsing can be taken into consideration by adjusting the position of the gas port blocks relative to each other.

Over and above this, it is also to be considered that a deterioration of the heat transmission or transfer to the tube will occur when there is a decrease in the tube diameter during a collapsing operation. The radial displaceability of the multi-jet gas blocks according to the second feature of the improved burner contributes to avoiding this deterioration. As a result of this feature, the multi-jet gas port blocks can be brought into a distance from the tube which is available for the heat transmission in accordance with the respective tube diameter of the tube during a collapsing operation.

The special focusing and/or directing of the various ports or jets of each of the multi-jet gas port blocks enables a generally improved heat transfer to the glass body. What can be achieved by means of this special directing or focusing is that the flames of the multi-jet gas port blocks can also surround the glass body corona-like even at the side of the body that faces away from the gas port blocks so that a larger generated surface of the tube is heated and a more uniform heating over the circumference of the body is achieved. Both burners will contribute to the improved heat transfer.

Overall, the inventive burner enables economical work given a low gas consumption.

The cooling of the multi-jet gas port blocks of the inventive burner counteracts a burnup and thus an emission of particles which would contaminate the glass body particularly a preform for optical glass fibers.

A discrete gas system enables a non-hazardous engagement and disengagement of the burner which is repeatedly conducted along the glass body in one direction of the rotational axis and is respectively shut off upon return in the opposite direction. The heating in the glass body, particularly a glass tube, during the production of preforms for glass fibers, can be optimally executed in various process phases with the inventive burner which is preferably operated with both hydrogen and oxygen.

It has been shown that the aforementioned advantages of the inventive gas burner can readily be achieved with only two multi-jet gas port blocks. Thus, the preferred advantageous design of the burner of the present invention utilizes only two multi-jet gas port blocks. It must be pointed out that in this context, the gas burner comprising only two multi-jet gas ports is already known per se from the above-mentioned publication Telcom Report No. 6.

It is practical to execute the burner of the present invention wherein the mounting means for the two multi-jet gas port blocks enable displacement of the blocks relative to one another along the rotational axis by at least a longitudinal extent which is the length or distance between the outmost jets in the arrangement in the direction of the rotational axis. The burner can therewith generate a hot zone whose length corresponds to the sum of the lengths of the individual hot zones that are generated with the individual multi-jet gas port blocks.

A structurally simple and expedient embodiment of the burner of the present invention is when the means for mounting each of the multi-jet gas port blocks includes a member for each of the blocks, which member has a respectively straight slide surface extending parallel to the radius of the respective blocks. The members are mounted on a common burner pedestal and are displaceable in a longitudinal direction of the rotational axis independent of one another. The burner pedestal itself is also displaceable in a longitudinal direction of the rotational axis.

An advantageous embodiment of the burner of the present invention has each of the members designed as a wedge-shaped member or coulisse which is pivotally mounted and/or displaceably seated on the burner pedestal to move perpendicular to the rotational axis. This further embodiment enables a relative position of the rotational axis and the burner pedestal to be varied so that the simultanous presence of the pivotability and displaceability perpendicular to the rotational axis is particularly advantageous. The burner can be adapted to the requirements of the respectively given condition by means of a variation of the relative position between rotational axis and burning pedestal.

Another preferred embodiment of the burner of the present invention is that besides being pivotably and displaceable perpendicular to the rotational axis, each of the port blocks is rigidly connected to a sliding carriage which is seated on the straight slide surface of the coulisse which is hinged on the burner pedestal so as to be vertically pivotable or displaceable relative to the rotational axis.

Another development of the burner of the present invention is that the focus or directing of the jets of each of the multi-jet gas ports lies outside of the glass body which is to be heated. Thus, each of the axes of each of the jets merge on this line which is at a distance from the port block that is greater than the distance of the rotational axis from the surface of the port block. Preferably, the focus line is more than twice as far as the distance to the rotational axis.

The gas port blocks are preferably aligned relative to each other and to the rotational axis so that their focus lines are laterally outside of the other block. Preferably, the two multi-jet gas port blocks are arranged with the axes of the port blocks extending in two different radial directions and intersecting on the rotational axis to form an angle of a range of 100° through 140°. This angular range has proven advantageous with respect to the mutual impinging flames of the two multi-jet gas port blocks and preferably forms an angle of about 120°.

The burner of the present invention is preferably designed so that the focus line of the multi-jet gas ports of each block is disposed on the block axis of the port block which axis penetrates the surface of the block having the gas ports and is perpendicular to a tangent thereof.

An advantageous and practical embodiment of the inventive burner is designed so that the gas jets of each of the port blocks are arranged on a front surface to form a grid-like arrangement with the jets being disposed in rows and columns that proceed perpendicular to one another. The rows proceed parallel and the column proceed perpendicular to the rotational axis. The jets of every column are directed to be allocated to a point on the respective focus line and the series of points formed extend parallel to the rotational axis.

In a preferred and advantageous embodiment of the burner of the present invention, the jets are disposed on a front surface of the gas port block which is a concave curved surface that is preferably a segment of a cylinder having a cylindrical axis that extends parallel to the rotational axis. Preferably, the radius of curvature of the concave curved surface is smaller than the distance of the focus line for the jets from the curved surface. In practice, the radius of curvature of the concave curved surface of the gas port block is the same for each of the port blocks and can be the distance of the curved surface from the rotational axis.

BRIEF DESCRIPTION OF THE DRAWINGS

FIG. 2 is a view of the gas burner with the rotational axis of the workpiece extending perpendicular to the plane of the drawing.

DESCRIPTION OF THE PREFERRED EMBODIMENTS

Figure 1:
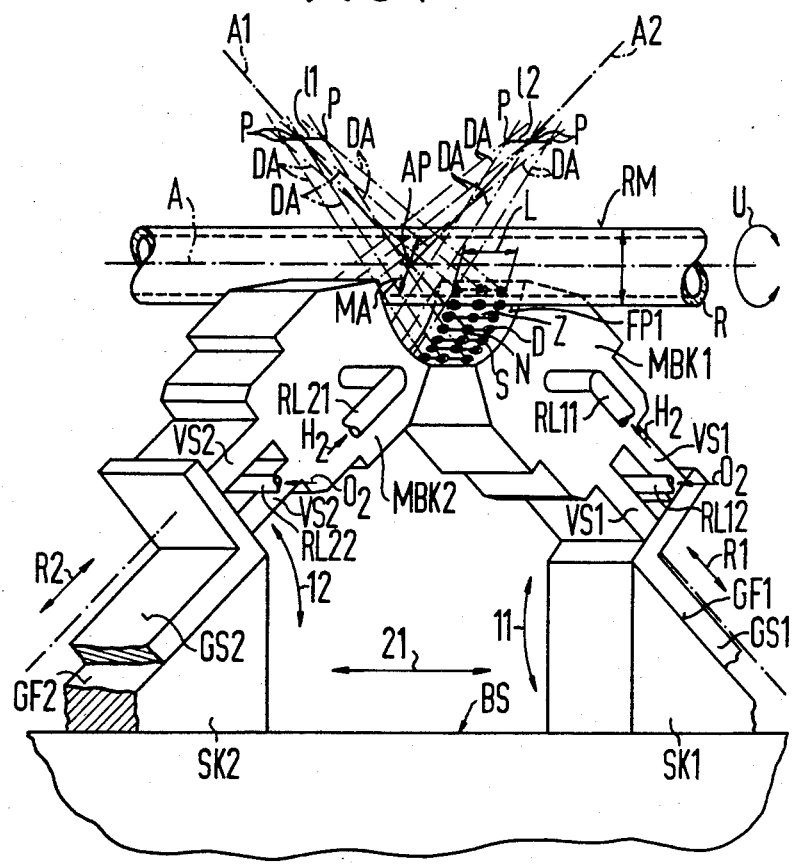
FIG. 1 is a perspective view of the gas burner in accordance with the present invention.

The principles of the present invention are particularly useful in a gas burner which is illustrated in the Figures and essentially consist of two structurally identical multi-jet gas port blocks MBK1 and MBK2 which have longitudinal axes or block axes A1 and A2, respectively. The port blocks MBK1 and MBK2 are aligned to a rotational axis A with the block axis A1 and A2, respectively, being allocated to different radial directions R1 and R2, respectively. In the Figures, the multi-jet gas port blocks MBK1 and MBK2 are shown in an opposite attitude in which the longitudinal axes A1 and A2 intersect at a point AP on the rotational axis A. Furthermore, a surface of each of the blocks having the multi-jet gas ports is the same radial distance "a" from the rotational axis A (see FIG. 2). The longitudinal or block axes A1 and A2 as best illustrated in FIG. 2, describe an angle $\alpha$ which is about 120°. It should be noted that the angle $\alpha$ can fall in the range of 100° to 140°.

The multi-jet gas port block MBK1 has a pair of webs VS1 which extend parallel to the axis A1 and are connected to a sliding carriage GS1. In a similar manner, the block MBK2 has a pair of webs VS2 which extend parallel to the axis A2 and are connected to a slide GS2.

Each sliding carriage GS1 and GS2, respectively, is displaceably seated on a straight slide surface GF1 or, respectively, GF2 of a support member SK1 and SK2 respectively. The members with the slide surface GF1 or GF2 are designed as a coulisse with a wedge shape and the surfaces GFL and GF2 are aligned to extend parallel to the radial directions R1 or R2, respectively. It is thereby possible to independently vary the radial distance "a" of each and every multi-jet gas port block MBK1 and MBK2, respectively, from the rotational axis A and to set the distance from the glass body to be heated such as the glass tube R as desired. The two supporting members SK1 and SK2 are seated on a shared burner pedestal BS at a distance from one another measured vertically relative to the rotational axis A. The burner pedestal is displaceable in either direction along the length of the rotational axis A and therefore perpendicular to the plane of the drawing for FIG. 2. Thus, during a heating cycle, the pedestal is displaced over the entire length of the tube R which is coaxial to the rotational axis A.

The two supporting members SK1 and SK2 are displaceble on the burner pedestal BS parallel to the longitudinal direction of the rotational axis A independent of one another. As a result thereof, the two gas port blocks MBK1 and MBK2 are additionally displaceable relative to one another in the direction of the rotational axis A and can thus be brought from the opposed attitude where the axis A1 and A2 intersect at a point AP and form a plane to positions in which the two axes A1 and A2 intersect the rotational axis A1 at a distance from one another.

The relative displaceability of the two gas port blocks MBK1 and MBK2 in the direction of rotational axis A enable not only the selective lengthening or shortening of the hot zone generated by the burners but can also be employed in order to reduce or eliminate an unfavorable, so-called spiral effect which occurs due to the continuous advancing of the hot zone along the rotational axis while the tube R is rotated on the rotational axis A. In order to reduce the spiral effect, for example, the two multi-jet gas port blocks MBK1 and MBK2 can be periodically oppositely displaced relative to one another on the burner pedestal BS during the advance of the burner pedestal. This displacement is only to such a degree that the individual hot zones generated by each of the individual multi-jet gas port blocks overlaps one another and they do not separate from each other.

Supporting members SK1 and SK2 are also hinged to the burner pedestal BS so that they may be pivoted perpendicular to the rotational axis in the direction of the double arrows 11 or 12, respectively. In addition, the two members SK1 and SK2 are displaceable on the burner pedestal perpendicular to the rotational axis A in the direction of the double arrow 21. As a result thereof, for example, the distance of the rotational axis A from the burner pedestal BS and the angle between the longitudinal axis A1 and A2 of the two multi-jet gas port blocks MBK1 and MBK2 can be varied so that the burner can be better adapted to various requirements.

Let it be pointed out in this context that the rotational axis A is defined as an axis which vertically penetrates the plane erected by the two intersecting longitudinal axes A1 and A2 of the two multi-jet gas port blocks MBK1 and MBK2 and is at the intersection point AP of the two axes. The rotational axis A and the longitudinal axis of the glass body or tube should be adjusted relative to one another so that they least roughly coincide.

The multi-jet gas port block MBK1 has a concave curved surface FP1 and the block MBK2 has a concave curved surface FP2. Both of these curved surfaces FP1 and FP2 face the rotational axis A and are segments of a cylindrical surface having a radius of curvature. These portions of the cylindrical surface have a cylindrical axis which extends parallel to the rotational axis and coincides therewith. Thus, the block axes A1 and A2 pass through the cylindrical axes of each of the respective surfaces FP1 and FP2. Specifically, each of the portions of the cylindrical surfaces FP1 and FP2 of the two multi-jet gas port blocks MBK1 and MBK2 have the same radius of curvature "a" which simultaneously corresponds to the distance of the multi-jet port blocks from the rotational axis A in the illustrated embodiment of the burner.

Each of the blocks has a plurality of jets D on the curved surface FP1 and FP2 which are in a grid-like arrangement. As illustrated, the jets D are disposed in rows Z extending parallel to the rotational axis A and in column S which proceed in a circumferential direction around the rotational axis A and thus perpendicular thereto. Each grid-like arrangement specifically consists of seven rows Z and three column rows S so that the arrangement has a total of 21 jets. The jets of rows Z and the column S are equidistantly spaced. The central jet D of every grid-like arrangement is disposed at a point N, which is the point of penetration of the longitudinal axis A1 or A2 of the particular port blocks MBK1 or MBK2, respectively, through the concave curved front surface FP1 or FP2.

The distance between the two outer column S of the grid-like arrangement of the jets D correspond to the longitudinal extent L of this arrangement along the rotational axis A. This longitudinal extent L defines the length of the hot zone which is generated by the particular multi-jet gas port block and the hot zone is essentially as long as the longitudinal extent L.

It should be noted that the just-described specific grid-like arrangement of the jets is a preferred arrangement. Dependent upon the requirements, however, the jet arrangements can also be advantageously utilized. In particular, a different number of jets can be selected.

The jets D arranged on the front surface FP1 or, respectively, FP2, of each of the multi-jet gas port blocks MBK1 or MBK2, respectively, are directed or focused at an allocated focus line l1 or, respectively, l2, which lies at a defined distance in front of the particular curved side FP1 or FP2. As illustrated, this distance is beyond the distance of the rotational axis A. What may be generally understood by focus is a prescribable, local three-dimensional region to which the jets of the allocated multi-jet gas port block are aligned or directed. The jets of a multi-jet gas port block are aligned or focused to a focus where their jet axes intersect in this focus line.

Given the illustrated burner, the focus line l1 or, respectively, l2, allocated to the multi-jet gas port blocks MBK1 or, respectively, MBK2, lie on a longitudinal axis A1 or A2, respectively. The distance of the focal line l1 or l2 from their particular front curved surface FP1 or, respectively, FP2, is defined by the distance between the penetration point of the respective longitudinal axes A1 or A2 which intersects this focal line at a center point p and penetrates the particular curved surface at point N. The distance of the focal line l1 or l2 from the rotational axis A is defined by the vertical distance of the penetration point p of the longitudinal axis A1 or, respectively, A2, through the focal line from the rotational axis A. Each of the focus lines l1 or l2 also corresponds to a line proceeding parallel to the rotational axis A in which the jet axes DA of the jets D on the curved surface FP1 or, respectively, FP2, of the allocated multi-jet gas port blocks MBK1 or MBK2 intersect. Specifically, the jet axes DA of the jets D of every column S of an exemplary grid-like arrangement of jets respectively intersect at a point p on the appertaining focal line l1 or l2 and the jets of different columns S intersect at different points p. According to the above definition, this can also be expressed in that the jets D of the column S are focused to a point p whereas the jets of a different column S are focused to a different point p. The jet axes DA of every column S of every grid arrangement of jets D extend in a plane which is perpendicular to the rotational axes A. The flame generated by each of the jets D extend unimpeded along its jet axis DA.

The maximum diameter MD of the glass body to be disposed on the rotational axis A and to be heated with the burner, i.e., the maximum outside diameter of a tube R, is defined on the basis of distance MA between the outer two rows of jet axes DA which are the only two rows shown in FIG. 1. The distance MA is taken on a line which extends perpendicular to the rotational axis A and also to the particular longitudinal axis A1 or A2 of the multi-jet port block MBK1 or, respectively, MBK2. The maximum diameter MD of the glass body should be only slightly greater than the distance MA that the flames from the jet D of the outer row Z place themselves as far as possible around the jacket RM of the glass body and therefore effect as uniform as possible a heating over the entire circumference of the glass body or tube R.

A concrete example of a burner in accordance with the present invention has the following dimensions: The distance of the focal line 1 and 2 from its allocated front concave curved surfaces FP1 or, respectivley, FP2, amounts to respectively 72.5 mm. The radius of curvature "a" of the concave curved surfaces FP1 and FP2 and thus the distance "a" of the rotational axis from the curved surfaces amounts to 15 mm. In every row Z and every column S, the distance between two neighboring jets D amounts to 4 mm. Every jet D is a coaxial jet of a discrete gas system wherein the inner jet has an inside diameter of about 1 mm and the outer jet surrounding the inner jet has an inside diameter of about 2 mm. Such coaxial jets are normally employed in discrete gas systems. The dimensions described hereinabove are suitable for tubes R having an outside diameter of 20 through 25 mm and a wall thickness of 1.5 through 2.5 mm. For a narrow hot zone required for collapsing the tube, the multi-jet gas port blocks are situated in an opposed relationship. For a broad hot zone required for deposition, they are oppositely displaced in the direction of the rotational axis A. When collapsing the tube R, the multi-jet gas port blocks change their radial distance from the axis A so that the shrinking tube R always remains in the region of optimum flame temperature which lies about 10 to 15 mm in front of the front curved surface of the multi-jet gas port block in the above-mentioned example.

As already mentioned, the two multi-jet gas port blocks of the example are equipped with discrete gas systems wherein the mixing of the combustion gases, oxygen and hydrogen, occur outside of the gas port block and thus offer non-hazardous operation. The hydrogen is laterally supplied to the particular multi-jet gas port blocks MBK1 or MBK2 through conduits RL11 or, respectively, RL21. The oxygen is supplied via a conduit RL12 or, respectivley, RL22, which conduits RL21 and RL22 extend between the webs such as VS1 or, respectively, VS2. The mixing of the combustion gases will occur only after the exit from the coaxial jet D in the flame zone by means of diffusion.

A water cooling prevents an oxidation of the multi-jet gas port blocks. Thus, injurious particle emissions are prevented. The emission and discharge of the cooling water occurs via conduits which are not shown in the Figures and the cooling water is annularly conducted around the discrete gas system in the multi-jet gas port block.

Although various minor modifications may be suggested by those versed in the art, it should be understood that we wish to embody within the scope of the patent granted hereon, all such modifications as reasonably and properly come within the scope of our contribution to the art.

We claim:

1. In a gas burner for externally heating glass bodies which are to be rotated relative to the burner on a rotational axis, said burner having a plurality of multi-jet gas port blocks with each block having a plurality of jets on a front surface around a block axis and means for mounting the blocks with the block axis of each block being on a separate radius extending from the rotational axis and with the jets facing the rotational axis and being at a given radial distance therefrom, said blocks being simultaneously displaced along the rotational axis, the improvements comprising the means for mounting enabling each of the multi-jet gas port blocks to be separately displaceable relative to one another along the rotational axis and to be displaceable relative to the rotational axis along the radial direction, and each of the jets on the front surface of each of the multi-jet blocks being directed to merge on a focal line lying beyond the rotational axis and at a definite distance in front of the front surface.

2. In a gas burner according to claim 1, wherein only two multi-jet gas port blocks are provided.

3. In a gas burner according to claim 2, wherein the means mounting the multi-jet gas port blocks enables displacement relative to one another along the rotational axis by at least a longitudinal extent of the arrangement of the jets of the block in the direction of the rotational axis.

4. In a gas burner according to claim 2, wherein the means for mounting the multi-jet gas port blocks includes a member for each of the blocks having a straight slide surface, each of the members being mounted for independent movement on a common burner pedestal, said burner pedestal being displaceable along the rotational axis.

5. In a gas burner according to claim 4, wherein each of the members having the straight slide surface are mounted on the burner pedestal for displacement perpendicular to the rotational axis.

6. In a gas burner according to claim 2, wherein the focal line of the multi-jet gas port blocks lies outside of the glass body being heated.

7. In a gas burner according to claim 6, wherein the radial distance of each of the multi-jet gas port blocks from the rotational axis is smaller than the distance of said focal line of said multi-jet gas port block from said rotational axis.

8. In a gas burner according to claim 7, wherein the focal line of a multi-jet gas port block is more than twice as far away from said rotational axis as said multi-jet gas port block is from said rotational axis.

9. In a gas burner according to claim 2, wherein the means for mounting the two multi-jet gas port blocks mount the blocks with the focal lines lying laterally outside of the other multi-jet gas port block.

10. In a gas burner according to claim 9, wherein the means for mounting the port blocks mounts the blocks with the block axes describing an angle in a range of 100° to 140°.

11. In a gas burner according to claim 10, wherein said angle is about 120°.

12. In a gas burner according to claim 2, wherein the focal line of each of the multi-jet gas port blocks is disposed on the block axis of the port block and is aligned to extend parallel to the rotational axis.

13. In a gas burner according to claim 12, wherein the jets of each of the multi-jet gas port blocks are in a grid-like arrangement with jets being arranged to lie in rows and columns which extend perpendicular to the rows, wherein said rows extend parallel to the rotational axis and said columns extend perpendicular to the rotational axis, wherein the jets of each of said columns are focused to an allocated point on the respective focus lines.

14. In a gas burner according to claim 13, wherein the grid-like arrangement of jets is disposed on a concave curved surface forming a front surface of the multi-jet gas port block, said curved surface being a portion of a cylindrical surface having a cylindrical axis extending parallel to the rotational axis.

15. In a gas burner according to claim 14, wherein the radius of curvature of the cylindrical surface is smaller than the distance of said focal line from said curved surface.

16. In a gas burner according to claim 15, wherein the concave curved surface of each of said multi-jet gas port blocks has the same radius of curvature.

17. In a gas burner according to claim 14, wherein said concave curved surface of each of said multi-jet gas port blocks has the same radius of curvature.

* * * * *